UNITED STATES PATENT OFFICE.

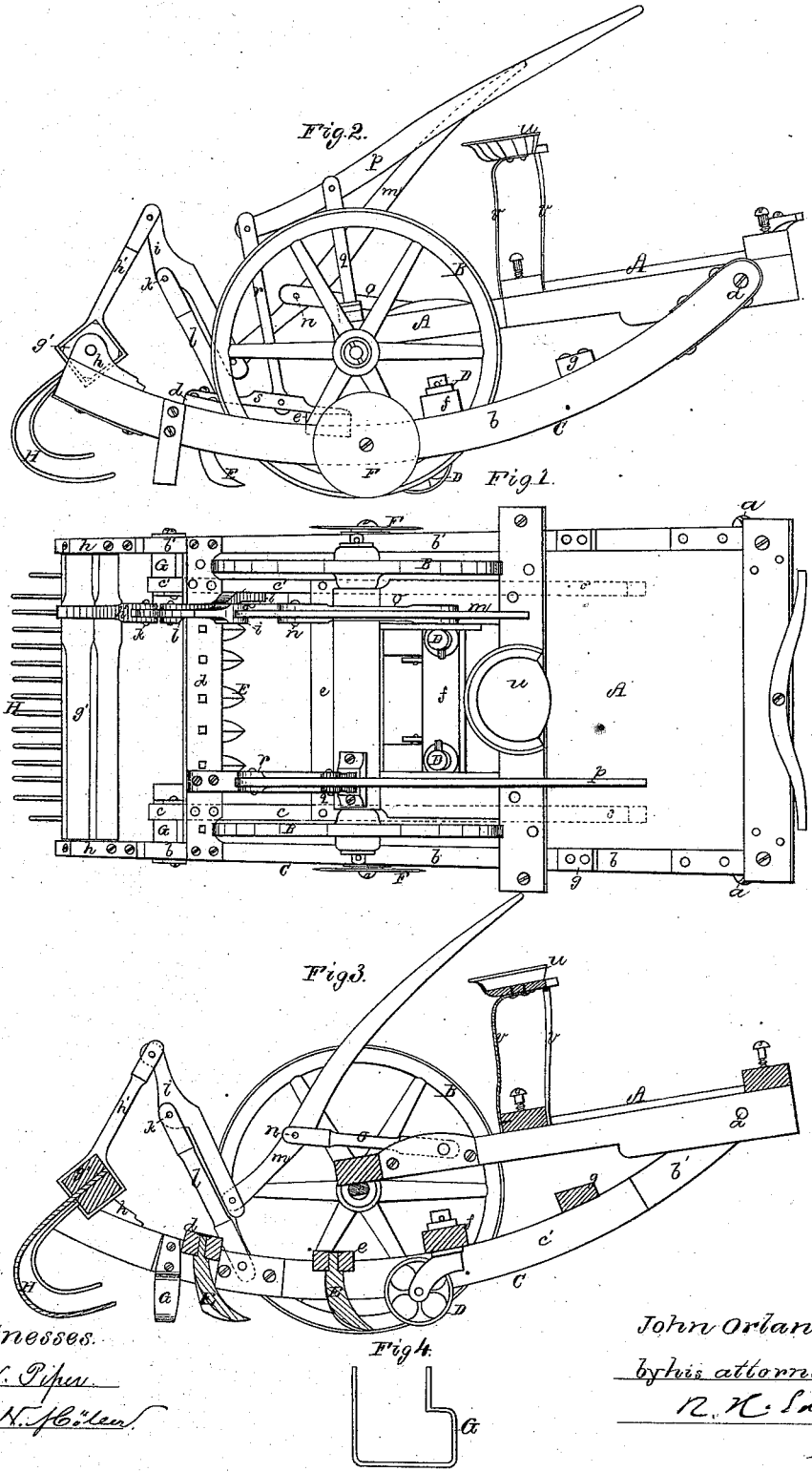

JOHN ORLANDO, OF WEST YARMOUTH, MASSACHUSETTS.

IMPROVEMENT IN STRAWBERRY-CULTIVATORS.

Specification forming part of Letters Patent No. 162,761, dated May 4, 1875; application filed February 12, 1875.

*To all whom it may concern:*

Be it known that I, JOHN ORLANDO, of West Yarmouth, of the county of Barnstable and State of Massachusetts, have invented what I term a new or Improved Strawberry-Cultivator; and do hereby declare the same to be fully described in the following specification and represented in the accompanying drawings, of which—

Figure 1 is a top view, Fig. 2 a side elevation, and Fig. 3 a longitudinal section, of it.

In such drawings, A denotes a platform-frame or carriage-body, mounted on two wheels, B B, arranged at its rear part in manner as shown. The said body or frame A at its front may or should be provided with shafts and a whiffletree, or other suitable devices, to enable it to be drawn by a horse or other animal. Combined with the said carriage-body A is another or movable frame, C, arranged and constructed in manner as shown, it being at its front part pivoted to the body A, so as to be capable of being turned upward or downward on such pivots, which are represented at $a\ a$. The frame C is composed of four curved longitudinal bars, $b\ b'\ c\ c'$, and a series of transverse connection-bars, $d\ e\ f\ g$, suitably bolted or fastened together. The wheels pass down through the frame C, and one wheel going between the bars $b\ c$ and the other between the bars $b'\ c'$ of said frame. The cross-bars $e\ f$ rest only on the bars $c\ c'$, and do not extend beyond them in directions toward the wheels. To the bar $f$ there is fixed, so as to project below it, one or more casters, D, or wheels, and from each of the bars $d\ e$ there extends downward a series of plow-teeth, E, those of each series being arranged at suitable distances apart. There is also pivoted to the frame C at or near its middle, and in opposite sides of it, two rotary disk knives or cutters, F F, which are to cut the runners or vines. Furthermore, directly in rear of each wheel is a plow-tooth, and in rear of that a U-shaped coverer or cutter, G, a front view of which is given in Fig. 4. It extends down from the frame C, in the manner as shown. At its extreme rear the frame C is provided with a vibrating toothed rake, H, whose head $g'$ is furnished at its ends with journals to turn in boxes $h\ h$. From the said rake-head an arm, $h'$, is projected, in the manner as shown, and is jointed to one arm of a lever, $i$, whose fulcrum $k$ is supported in the upper part of a post, $l$, which, at or near its foot, is pivoted to the frame C. The lever $i$ at its front end is jointed to a hand-lever, $m$, whose fulcrum $n$ is supported by another post, $o$, which, at or near its foot is pivoted to the carriage A, all being as represented. By means of the arm $h$ levers $i\ m$ and posts $l\ o$ the rake-head may be partially revolved or turned, as occasion may require, either for setting the rake to gather up the runners or vines and weeds, or for dumping the load of the rake. A lever, $p$, fulcrumed on a post, $q$, extended up from the carriage A, is connected with the frame C by a rod, $r$, and a cross-bar, $s$, arranged as represented, the rod $r$ being jointed both to the lever and the cross-bar. Between the levers $m$ and $p$ is a driver's seat, $u$, supported by legs $v\ v\ v$, extending from it down to the carriage-body A. By means of the lever $p$ and connection-rod $q$ the frame C may be either raised or lowered by the driver, in order to either move the plow-teeth, rotary cutters U, knives, and rake-teeth off or out of or into contact with the ground.

While drawing the machine from one end to the other of a row in a field of strawberry-vines the plow-teeth, cutters, and rake should be down to their lowest positions, in order that while the machine may be advancing the rotary cutters may cut the runners or vines, the plow-teeth penetrate them and the earth, and turn such up. The U-shaped cutters and the casters or wheels D prevent the teeth and rotary cutters from working too deep in the earth. The U-shaped cutters also operate to level the soil turned up by the two teeth directly in front of them, and which open the earth in the tracks of the wheels. The U-shaped cutters also aid in holding the runners, in order that they may properly gather in and be caught by the rake. After the machine may have been drawn through the row the frame C should be raised up, and the rake should be turned so as to dump its charge of runners or weeds, all of which may be accomplished by the attendant by means of the hand-levers, as explained.

I claim in the strawberry-cultivator, as described, as follows, viz:

1. In combination with a wheeled carriage, A, and frame C, arranged and applied together, as described, a vibratory rake, H, disk-cutters F F, a series of plow-teeth, E, and cutters G, all being arranged to operate as explained.

2. In combination with the wheel-carriage A, the vibratory rake, and the frame C, arranged and applied together, as specified, the arms $h'$ $l$ $o$ and the levers $i$ $m$, pivoted together, and applied all as shown and described.

JOHN ORLANDO.

Witnesses:
 HEMAN B. CHASE,
 HEMAN B. CHASE, Jr.